(12) United States Patent
Guering

(10) Patent No.: US 7,891,606 B2
(45) Date of Patent: Feb. 22, 2011

(54) AIRCRAFT COMPRISING A LANDING GEAR COMPARTMENT PERMITTING BETTER INTEGRATION OF THE LANDING GEAR

(75) Inventor: Bernard Guering, Montrabe (FR)

(73) Assignee: Airbus Operations SAS, Toulouse (FR)

( * ) Notice: Subject to any disclaimer, the term of this patent is extended or adjusted under 35 U.S.C. 154(b) by 708 days.

(21) Appl. No.: 11/898,550

(22) Filed: Sep. 13, 2007

(65) Prior Publication Data
US 2008/0223984 A1    Sep. 18, 2008

(30) Foreign Application Priority Data
Sep. 14, 2006   (FR) .................................... 06 53730

(51) Int. Cl.
  *B64C 25/18*  (2006.01)
  *B64C 24/34*  (2006.01)
(52) U.S. Cl. ................................ 244/102 R; 244/103 R
(58) Field of Classification Search ............. 244/102 R, 244/102 A, 100 R, 103 R
See application file for complete search history.

(56) References Cited

U.S. PATENT DOCUMENTS

| 1,987,049 | A | | 1/1935 | Burnelli | |
| 2,138,030 | A | * | 11/1938 | Giovannoli | 244/102 R |
| 2,826,381 | A | * | 3/1958 | Cruz | 244/102 SL |
| 2,982,500 | A | * | 5/1961 | Lucien | 244/102 R |
| 5,263,664 | A | * | 11/1993 | Derrien et al. | 244/102 R |
| 5,839,692 | A | * | 11/1998 | Ralph et al. | 244/102 SL |
| 6,213,428 | B1 | * | 4/2001 | Chaumel et al. | 244/119 |

FOREIGN PATENT DOCUMENTS

| FR | 847 813 | A | 10/1939 |
| GB | 327604  | A | 4/1930  |
| GB | 508211  | A | 6/1939  |
| GB | 521634  | A | 5/1940  |

\* cited by examiner

*Primary Examiner*—Tien Dinh
(74) *Attorney, Agent, or Firm*—Young & Thompson

(57) ABSTRACT

An aircraft includes a gear compartment in which is adapted to be disposed a raisable forward landing gear, the landing gearing comprising at least one gear leg connected to the aircraft structure and supporting at least one pair of wheels disposed on opposite sides of the gear leg, an articulation part to incline at least one wheel relative to the lifting plane of the landing gear, the gear compartment including an upper panel serving as a floor, with at least one hollow shape F enclosing as closely as possible the at wheels when the landing gear is in raised position.

16 Claims, 4 Drawing Sheets

AIRCRAFT COMPRISING A LANDING GEAR COMPARTMENT PERMITTING BETTER INTEGRATION OF THE LANDING GEAR

The present invention relates to an aircraft having a landing gear compartment permitting better integration of the landing gear, particularly of the forward landing gear.

An aircraft generally has a forward landing gear and at least two rear landing gears, said forward landing gear comprising at least one wheel. More commonly, in aircraft design for transport of freight or persons, a forward landing gear comprises a pair of wheels and the rear gear several pairs of wheels.

During flight, each landing gear is raised into a gear compartment, integral with the fuselage, so as to improve the aerodynamics of the aircraft by limiting drag.

Figure 1:
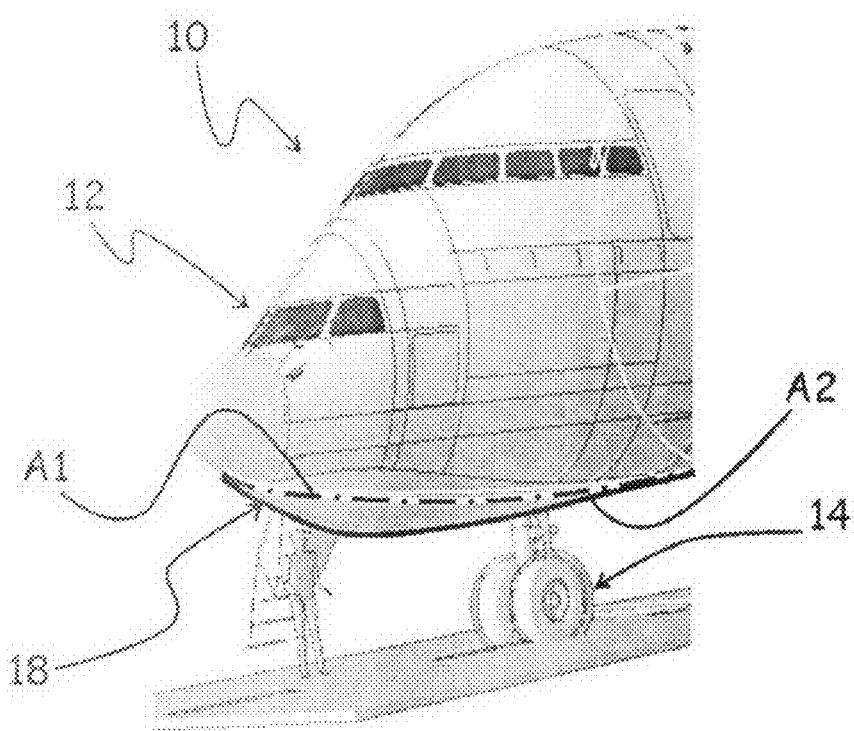
Figure 2:
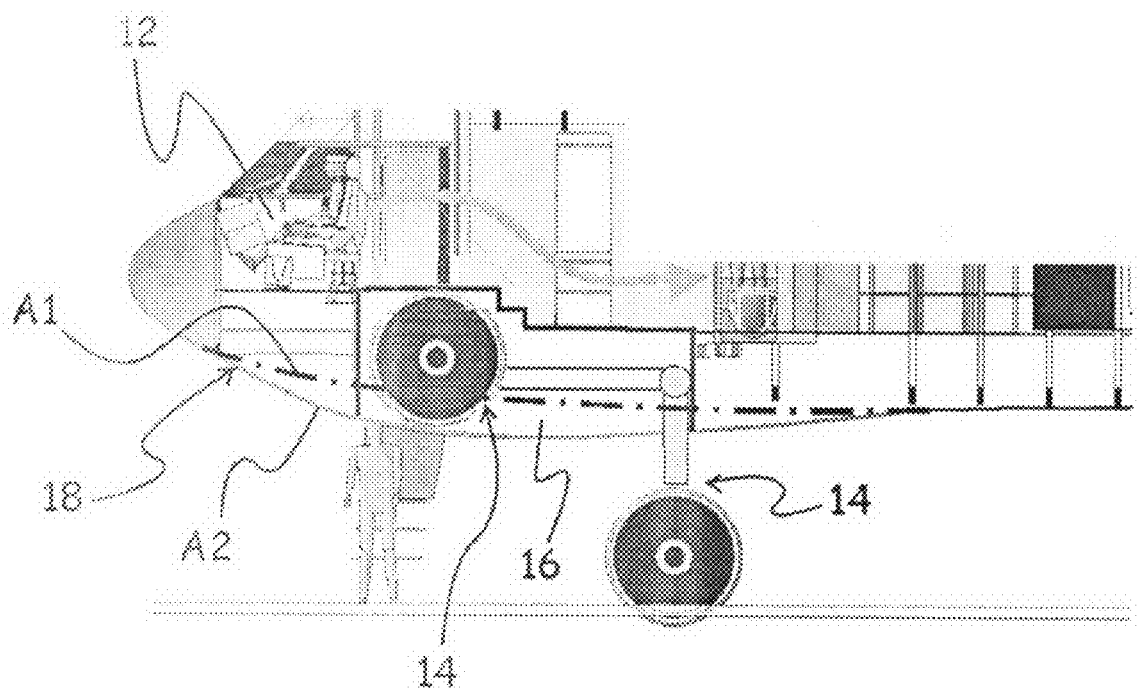

In FIGS. 1 and 2, there is shown an aircraft 10 with a raised cockpit 12 and a forward landing gear adapted to be disposed in a gear compartment 16 in raised position. This gear compartment is generally provided below a substantially flat floor.

In known manner, the aircraft comprises a fuselage 18 whose shape is adapted to optimize aerodynamic flow about said aircraft and particularly to improve the penetration into air so as to reduce drag. There is shown in broken line the optimum profile of the fuselage of the front lower part of the aircraft, called ideal aerodynamic profile A1.

A first design consists in integrating the gear compartment 16 within a fuselage respecting the ideal profile A1. Thus the lower part or floor of the forward gear compartment does not comprise a swelling below said fuselage.

However, according to this first design, the height of said gear compartment would interfere with the different volumes and functions located immediately above said gear compartment, the height of a gear compartment being at least equal to the diameter of a wheel.

For certain aircraft, of long or a medium range, particular for which it is provided that the cockpit 12 be lowered, it is very difficult, taking account of the size constraints dictated by the numerous volumes and systems at present located in the lower part of the aircraft, particularly forward thereof, to arrive at an ideal aerodynamic profile of this fuselage in line with the compartment of a raisable landing gear, without interfering with said numerous other volumes and systems located in the lower portion of the aircraft.

As a result, according to another design shown in FIGS. 1 and 2, the gear compartment 16 is semi-integrated and exceeds the ideal aerodynamic profile A1. In this case, the fuselage 18 follows the full line profile A2 forming a slight swelling, at the level of the gear compartment.

The dimensions of this swelling result from a compromise between on the one hand the size constraints dictated by the numerous volumes and systems at present located in the lower portion of the front of the aircraft, and on the other hand aerodynamic constraints. However, this swelling, even geared in an optimum manner, detracts from the aerodynamic properties.

However, the improvement of aerodynamics of the aircraft is one of the principal objects pursued by aircraft manufacturers. These latter seek to produce aircraft which consume the least possible fuel during flight to respond to the requirements of their clients, said clients being careful to achieve economy in fuel which is of relatively high cost and more often increasing than decreasing.

Also, the present invention seeks to overcome the drawbacks of the prior art by providing an aircraft comprising a landing gear compartment whose shape permits better integration of the landing gear.

To this end, the invention has for its object an aircraft comprising at least one gear compartment in which is adapted to be stored landing gear comprising at least one wheel, characterized in that said gear compartment comprises an upper panel of at least one hollow shape F enclosing as closely as possible said at least one wheel when the landing gear is in raised position. This configuration permits reducing the height of the gear compartment, except at the level of the shape F, and thus provides better integration of the landing gear.

Given the maximum constraints of size encountered by the front landing gear because of the lowering of the cockpit in certain aircraft, the present invention will be described in the case of a forward gear compartment located immediately below the lowered cockpit of an aircraft. However, it is evident that the use of raisable landing gear according to the invention for other landing gear than the forward one and on other aircraft whose cockpit is not lowered, is also covered by the invention.

Figure 3:
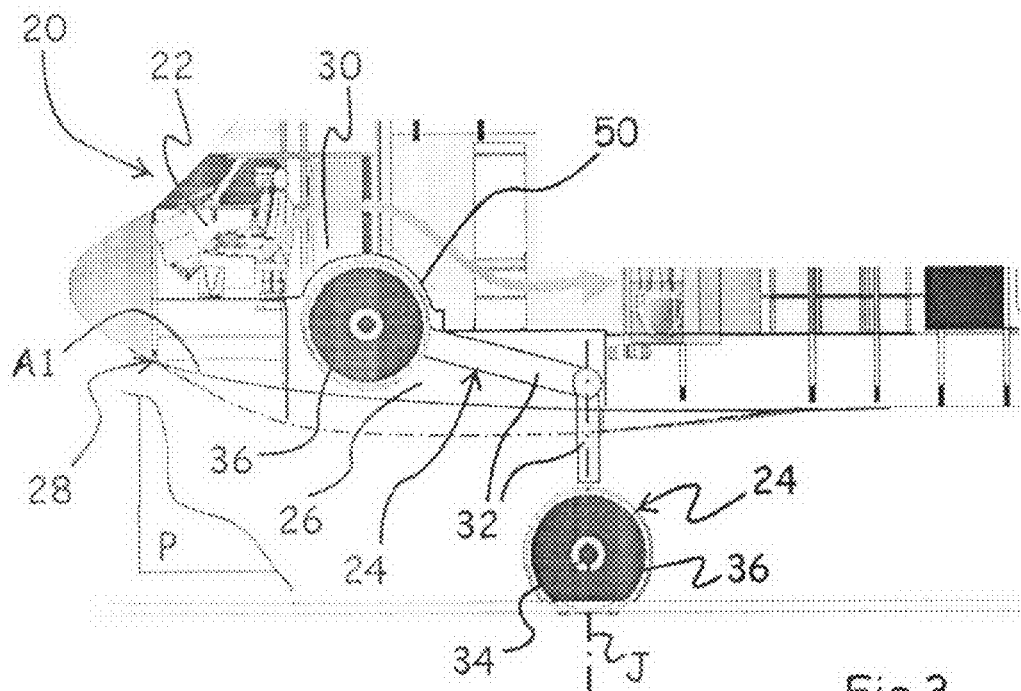
Figure 4:
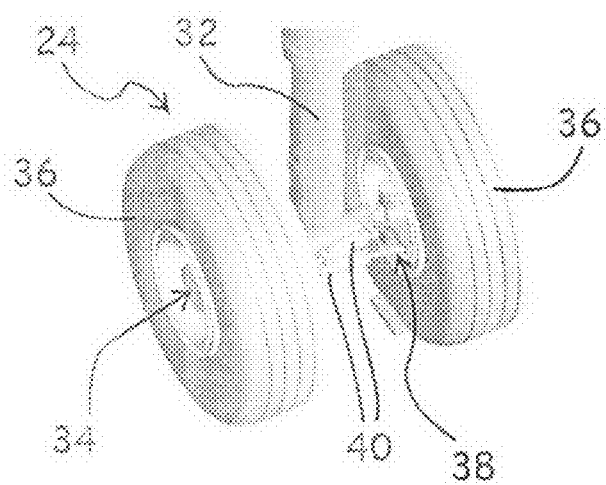
Figure 5:
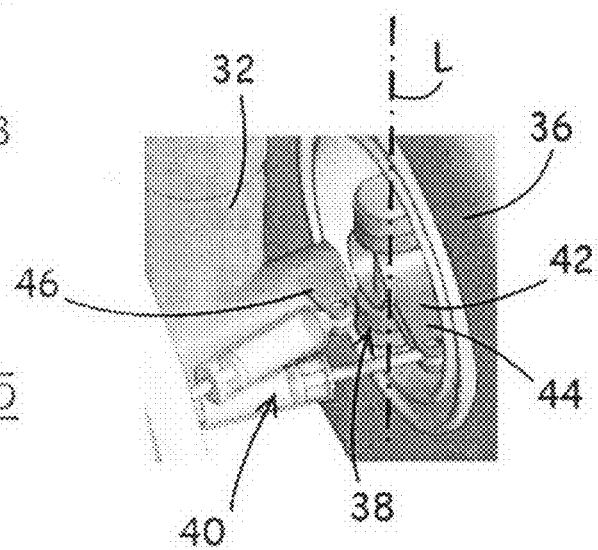
Figure 6:
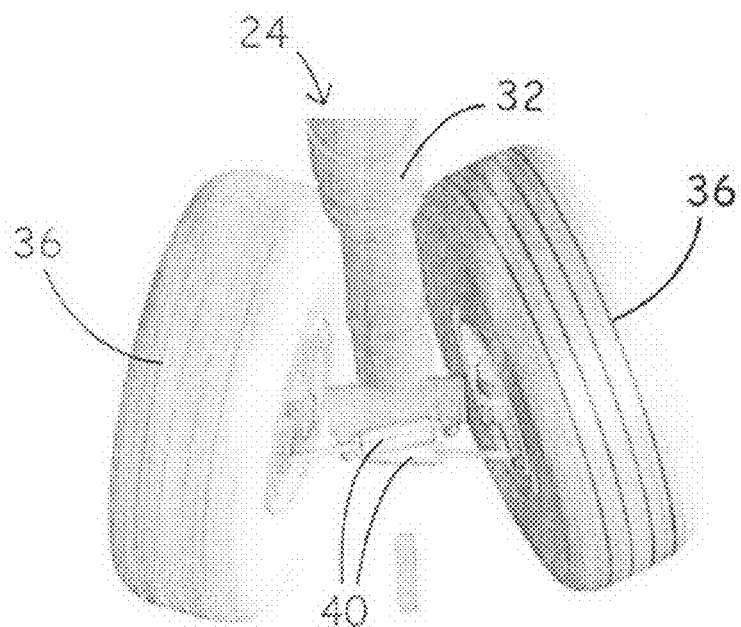
Figure 9:
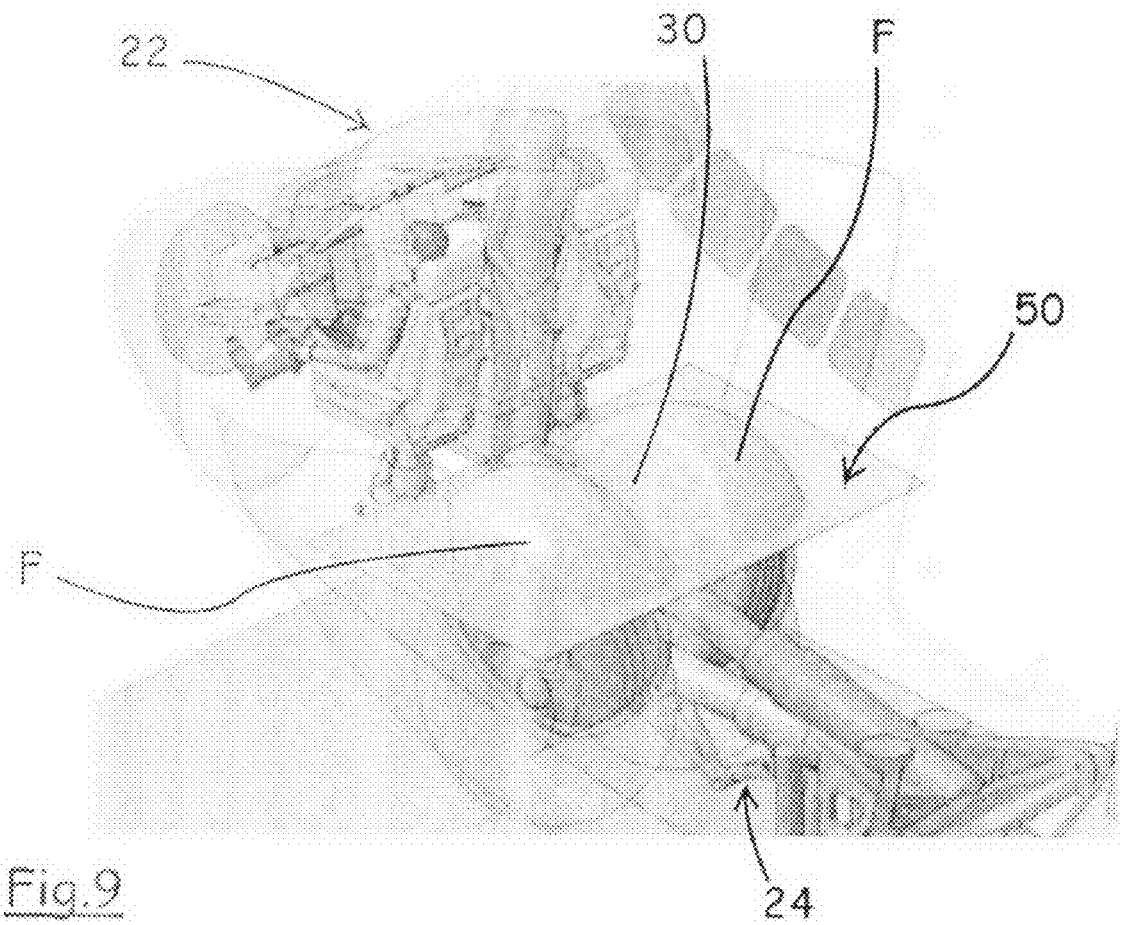
Figure 7:
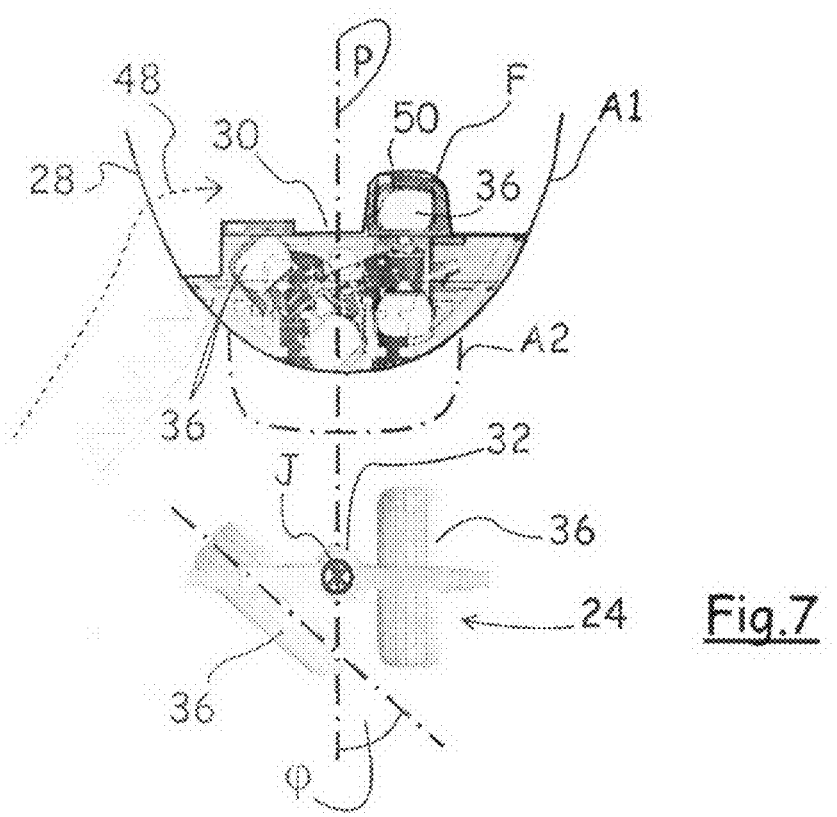
Figure 8:
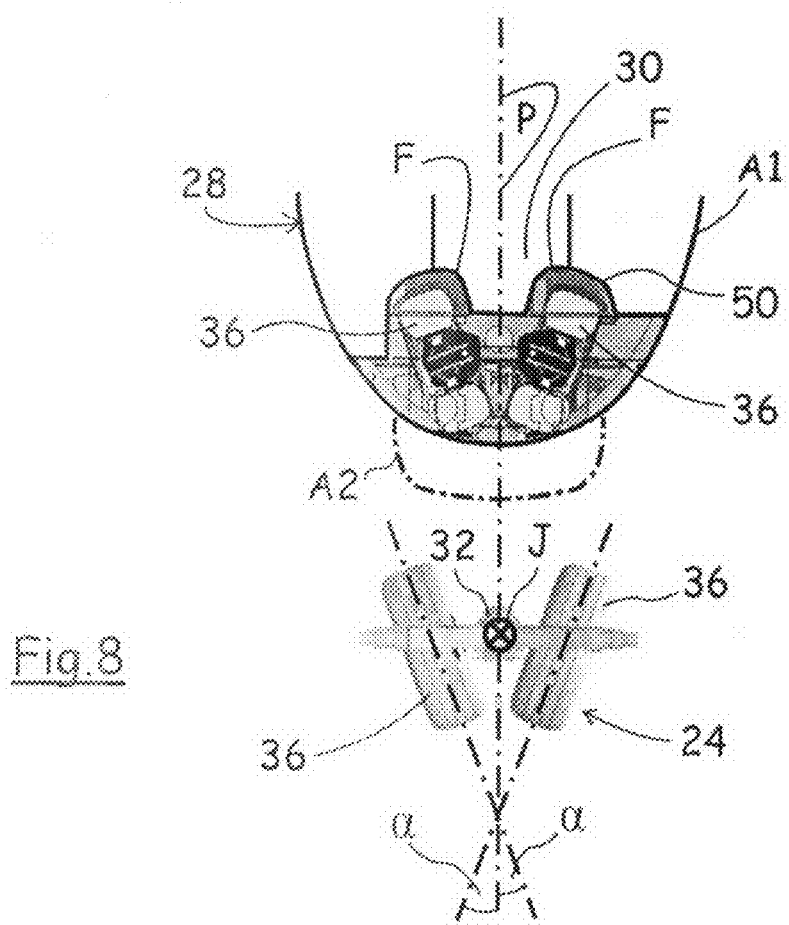

Other characteristics and advantages will become apparent from the description which follows, of the invention, which description is given only by way of example, with respect to the accompanying drawings, in which:

FIG. 1 is a representation of an aircraft having raisable forward landing gear according to the prior art, FIG. 2 is a view in longitudinal cross-section of an aircraft in the plane of raising of the forward landing gear, said aircraft having a raisable landing gear according to the prior art, FIG. 3 is a representation in longitudinal cross-section of an aircraft on the plane of raising the forward landing gear, said aircraft having a raisable landing gear according to the invention, FIG. 4 is a view of raisable landing gear according to the invention, FIG. 5 is a detailed view of the showing of FIG. 4, FIG. 6 is a view of a raisable landing gear according to the invention with the articulation means actuated, FIG. 7 is a view of a first arrangement of inclination of at least one pair of wheels of a raisable landing gear according to the invention, FIG. 8 is a view of a second configuration of inclination of at least one pair of wheels of a raisable landing gear according to the invention, and FIG. 9 is a view in transparency of the nose of an aircraft receiving a raisable landing gear and a gear compartment according to the invention.

In FIG. 3, there is shown an aircraft 20 with a lowered cockpit 22 and a landing gear 24 adapted to be disposed in a gear compartment 26.

In FIGS. 3, 7 and 8, the broken line A2 shows the profile of the fuselage 28 for an aircraft having a landing gear according to the prior art, with a semi-integrated gear compartment; and a line A1 in full lines shows the ideal aerodynamic profile for the fuselage 28 at the level of the forward gear compartment 26 so as to limit to the maximum the aerodynamic drag.

In known manner, the landing gear 24 pivots relative to the structure of the aircraft 20 in a plane P of raising between its so-called landing position and its so-called raised position into the gear compartment 26. For a forward landing gear 24, the lifting plane P corresponds substantially to the vertical plane of symmetry of the aircraft.

According to modifications, the gear compartment 26 can be disposed below the cockpit 22 and/or on a corridor 30 running from the cockpit toward the rear portion of the aircraft.

The landing gear 24 comprises at least one gear leg 32, connected to the structure of the aircraft 20 by suitable means permitting it to pivot in the lifting plane P of said gear, but not shown in the figures because it is not the object of the present invention, and supporting at least one wheel axle 34 and its wheel 36.

The drawings relate to a landing gear 24, particularly a forward one, that is raisable and comprises a pair of wheels disposed on opposite sides of the gear leg, which is most often the case in long distance and medium distance aircraft 10.

However, there exist aircraft for which the forward landing gear comprises only a single wheel, and it is evident that the improvements provided by the present invention can also be used on a single wheel landing gear as well as on a gear with several pairs of wheels. The invention seeks to minimize the volume occupied by a raisable landing gear, and hence is applicable to all the raisable landing gears of aircraft or other apparatus.

According to the invention, the landing gear 24 comprises articulation means 38 so as at least to incline a wheel 36 relative to the lifting plane P of said gear, particularly when the landing gear is in raised position.

According to a first embodiment, the articulation means 38 are comprised in the gear leg 32, said gear leg 32 being in two parts articulated relative to each other, adapted to move in rotation and/or in translation relative to each other.

According to a second embodiment, the articulation means 28 are located between the gear leg 32 and the wheel 36. In this case, the articulation means are provided at the level of the connection between the leg 32 and the wheel axle 34, or the wheel axle can be made of two parts articulated relative to each other.

In the first as in the second embodiment, the articulation means 38 can be in the form of a connection permitting at least rotation, for example a ball joint connection or a pivotal connection, between the two portions or elements connected by the articulation means 38.

As the case may be, the movement between said portions or elements connected by the articulation means 38 can be caused by different means, simultaneously or not, for deploying or raising the landing gear 24.

According to a first modification, the articulation means 38 can be actuated by mechanical means, such as a deformable parallelogram device or the like, actuated by the same means which ensure the deployment or raising of the landing gear 24. Said mechanical means requires the relative movement of the two portions or elements separated by the articulation means 38, thereby giving rise to inclination of at least one wheel 36 relative to the lifting plane P, substantially simultaneously with the deployment or the raising of the landing gear 24.

According to a second modification, the articulation means 38 can be actuated by any actuator 40, such as a hydraulic or electric jack. Said actuator 40 is connected at each of its ends to one or the other of the two elements or portions separated by the articulation means 38 and controlled by means known to the art and at present used in aircraft adapted to receive landing gear 24 that can be raised according to the invention. Said actuator 40 gives rise to relative movement of the two elements, or portions, separated by the articulation means 38, thereby causing the inclination of at least one wheel 36 relative to the lifting plane P.

According to another preferred embodiment and shown in detail in FIG. 5, said articulation means 38 comprise a support 42 adapted to receive at least one wheel axle and connected to the gear leg 32 by an articulated connection permitting at least one rotation. In the illustrated example, the gear leg 32 is T-shaped. A first end of the crosspiece of the T comprises an axis L substantially parallel to the axis J of the gear leg about which a first support 42 can pivot, which supports the first wheel axle and its wheel 36. The first support 42 comprises an arm 44 at the end of which is connected a first end of a first actuator 40. The other end of said first actuator 40 is connected to the leg, and more particularly to the second end of the T. Desirably, in the case of a pair of wheels, a second end of the crosspiece of the T comprises an axis L substantially parallel to the axis J of the gear leg about which pivot a second support 42 supporting a second wheel axle and its wheel 36. The second support 42 comprises an arm 44 at the end of which is connected a first end of a second actuator 40. The other end of said second actuator 40 is connected to the leg, and more particularly to the first end of the T 46.

Thus, the pivoting of the support 42, under the action of the actuator 40, takes place along an axis L substantially parallel to the axis J of the gear leg 32, itself parallel to the lifting plane P, and gives rise to an inclination of the wheel 36 relative to the lifting plane P during lifting or deployment of the raisable landing gear 24.

The inclination of the wheel 36 permits limiting the height of the gear compartment 26 by decreasing the volume occupied by the landing gear 24 in the raised position. Thus, it is possible to integrate said gear compartment into a fuselage 28 respecting the ideal aerodynamic profile, shown by the line A1 in the drawings. Contrary to the prior art, the fuselage has no swelling shown by the line A2 in FIGS. 7 and 8.

The inclination of the wheel 36 relative to the lifting plane P can have several possible values according to the different systems and volumes surrounding the gear compartment 16. If for a raisable landing gear supporting a single wheel 36, the different possible configurations amount to the different inclinations that the wheel can take relative to the lifting plane P, such is not also true for landing gear 24 supporting a pair of wheels 36, said wheels being disposed on opposite sides of the gear leg 32.

The invention thus provides two possible configurations of inclination of the wheels 36 of a raisable landing gear 24.

According to a first configuration shown in FIG. 7, only one of the wheels 36 is inclined at an angle f relative to the lifting plane P. This configuration permits obtaining a large angle which contributes to reducing the height of the gear compartment in line with this wheel that is adapted to be inclined. This configuration is more particularly adaptable if said wheel is disposed in line with a lateral access.

According to a second arrangement shown in FIG. 8, the two wheels 28 are inclined oppositely by an angle a relative to the lifting plane P. This arrangement permits reducing the height of the gear compartment in line with the two wheels, however to a lesser extent than before, the angle a being less than the angle f to the extent to which the radius of a wheel is greater than the dimension separating the articulation means 38 of the gear leg 32. This arrangement is more particularly adaptable if the wheels are disposed in line with a corridor 30 disposed in the longitudinal direction of the aircraft.

Desirably, the articulation means 38 are disposed at the level of the wheel 36 to obtain minimum space occupied by the wheel and hence to permit optimum decrease in the height of the gear compartment in line with said wheel 36.

In the first, as in the second arrangement of the inclination of the wheels 36, the inclination of one wheel 36 is preferably carried out such that the angle f or a between the wheel 36 and the lifting plane P will be an angle opening inwardly of the aircraft 20 when the landing gear is raised. This permits the wheel 36 to take substantially the lower shape of the fuselage 28 so as to arrive at an embodiment of said aircraft fuselage 20 according to the ideal aerodynamic profile shown by the line A1 in the drawings.

According to another characteristic of the invention, as shown in FIGS. 7, 8 and 9, the gear compartment 26 comprises an upper panel 50 serving as a floor for the cockpit 22 and/or the corridor 30 leading to the rear region. Desirably, said upper panel 50 has a hollow shape F quite particular to encase as closely as possible the wheels 36, inclined or not. Said shapes F extend beyond the rest of the surface of said upper panel 50, to the extent such that the floor is not flat but comprises protuberances corresponding to the shapes F between which can be provided the corridor 30. According to this arrangement, the corridor 30 is of sufficient width to permit the passage of a person as shown in the transparency view of FIG. 9.

FIG. 9 shows an aircraft 10 receiving a raisable landing gear 18 with an upper panel 50 for the gear compartment 16 enveloping as closely as possible the wheels 36 of said gear 24. The landing gear 18 can thus be raised to a maximum, permitting ideal aerodynamic profile of the fuselage 28 in the lower part in line with said gear compartment 26, and the shapes F enclosing the wheels 36 interfering to the minimum with the volumes and systems located above the gear compartment 26, particularly in the case of a lowered cockpit 22. As the case may be, this arrangement can be associated or not with a landing gear comprising at least one wheel inclinable relative to the lifting plane P.

The invention claimed is:

1. Aircraft comprising:
   at least one gear compartment in which is adapted to be disposed a raisable forward landing gear (24),
   said landing gearing comprising at least one gear leg (32) connected to the aircraft structure (20) and supporting at least one pair of wheels (36),
   said wheels (36) being disposed on opposite sides of the gear leg (32),
   said landing gear (24) comprising articulation means (38) so as to incline at least one wheel (36) relative to the lifting plane P of the landing gear (24),
   said articulation means (38) being connected by a connection permitting at least one rotation, and
   said gear compartment comprising an upper panel (50) serving as a floor with at least one hollow shape F being angled with respect to the lifting plane P and enclosing one of the wheels (36) when the landing gear is in raised position.

2. Aircraft according to claim 1, characterized in that the upper panel (50) comprises two hollow shapes defining at the level of the floor two protrusions between which can be provided a corridor (30).

3. Aircraft according to claim 1, characterized in that the articulation means (38) permitting inclining the wheel (36), at least one, relative to the lifting plane P of the landing gear (24) are located between the gear leg (32) and the wheel (36).

4. Aircraft according to claim 3, characterized in that the articulation means (38) comprise a support (42) adapted to receive at least one wheel axle (34) and connected to the gear leg (32) by a pivot connection with an axis L substantially parallel to the axis J of the gear leg (32).

5. Aircraft according to claim 4, characterized in that only one of the wheels (36) can be inclined at an angle φ relative to the lifting plane P.

6. Aircraft according to claim 4, characterized in that the two wheels (36) can be inclined in an opposite manner by an angle a relative to the lifting plane P.

7. Aircraft according to claim 4, characterized in that the angle between the wheel (36) and the lifting plane P is an angle opening inwardly of the aircraft (20) when the landing gear (24) is raised.

8. Aircraft according to claim 3, characterized in that only one of the wheels (36) can be inclined at an angle φ relative to the lifting plane P.

9. Aircraft according to claim 3, characterized in that the two wheels (36) can be inclined in an opposite manner by an angle a relative to the lifting plane P.

10. Aircraft according to claim 3, characterized in that the angle between the wheel (36) and the lifting plane P is an angle opening inwardly of the aircraft (20) when the landing gear (24) is raised.

11. Aircraft according to claim 1, characterized in that only one of the wheels (36) can be inclined at an angle φ relative to the lifting plane P.

12. Aircraft according to claim 11, characterized in that the angle between the wheel (36) and the lifting plane P is an angle opening inwardly of the aircraft (20) when the landing gear (24) is raised.

13. Aircraft according to claim 1, characterized in that the two wheels (36) can be inclined in an opposite manner by an angle a relative to the lifting plane P.

14. Aircraft according to claim 1, characterized in that the angle between the wheel (36) and the lifting plane P is an angle opening inwardly of the aircraft (20) when the landing gear (24) is raised.

15. An aircraft comprising:
    a gear compartment including an upper panel (50) serving as a floor with a hollow shape; and
    a raisable forward landing gear (24) adapted to be disposed in the gear compartment,
    the landing gear comprising a gear leg (32) connected to the aircraft structure (20), a pair of wheels (36) disposed on opposite sides of the gear leg (32), and articulation means (38) to incline the pair of wheels (36) relative to a lifting plane P of the landing gear (24), wherein,
    at least one of the pair of wheels is enclosed by the hollow shape when the landing gear is in the raised position, and
    only one of the pair of wheels (36) can be inclined at an angle φ relative to the lifting plane P.

16. An aircraft comprising:
    at least one gear compartment in which is adapted to be disposed a raisable forward landing gear (24),
    said landing gearing comprising at least one gear leg (32) connected to an aircraft structure (20) and supporting at least one pair of wheels (36),
    said wheels (36) being disposed on opposite sides of the gear leg (32),
    said landing gear (24) comprising articulation means (38) so as to incline at least one wheel (36) relative to the lifting plane P of the landing gear (24),
    said articulation means (38) being connected by a connection permitting at least one rotation,
    said gear compartment comprising an upper panel (50) serving as a floor and having at least one hollow shape F being angled with respect to the lifting plane P and enclosing at least one of wheels (36) when the landing gear is in raised position, the floor including protuberances corresponding to the at least one hollow shape F.

* * * * *